Figure 1:
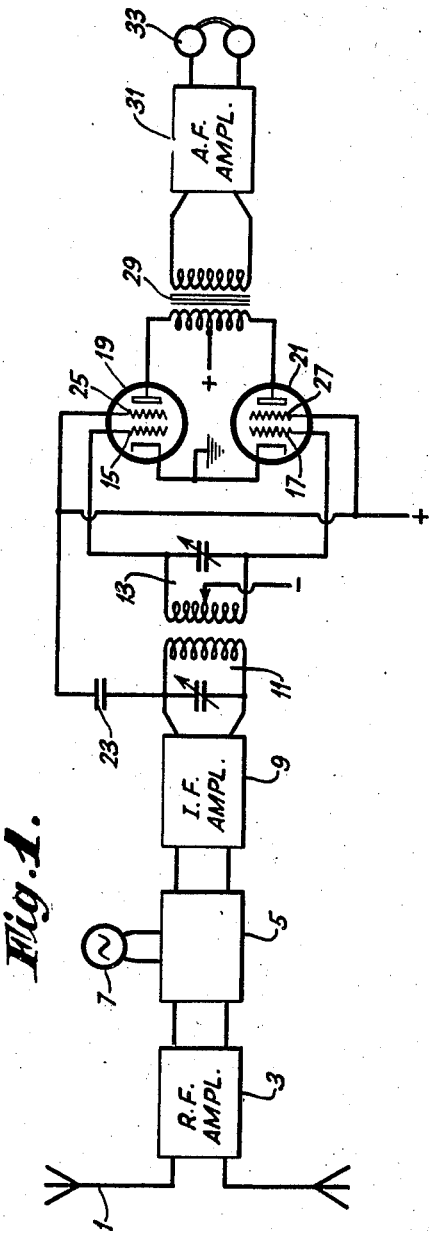

May 5, 1942.　　　　H. TUNICK　　　　2,282,101
DETECTION OF FREQUENCY MODULATED WAVES
Original Filed Dec. 22, 1939　　4 Sheets-Sheet 1

INVENTOR
*HARRY TUNICK*
BY
ATTORNEY

May 5, 1942.  H. TUNICK  2,282,101
DETECTION OF FREQUENCY MODULATED WAVES
Original Filed Dec. 22, 1939  4 Sheets-Sheet 2
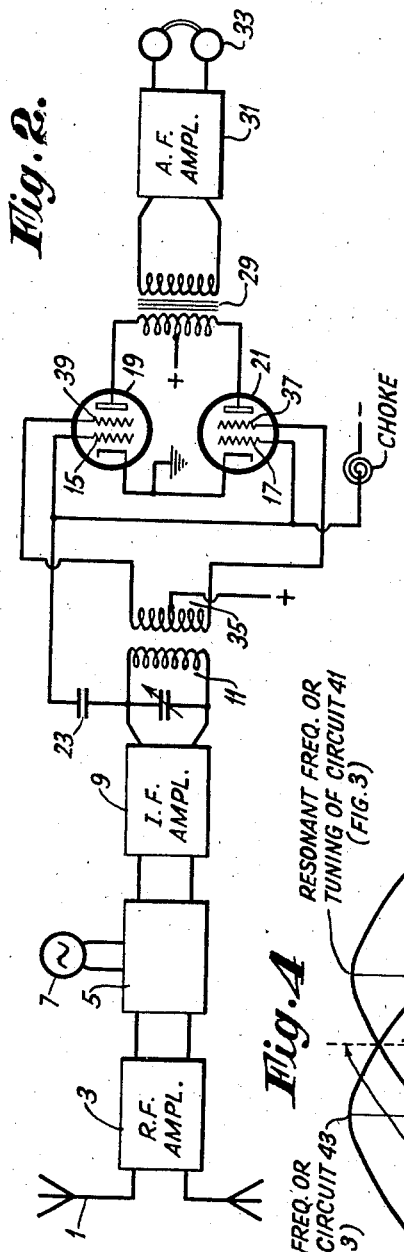
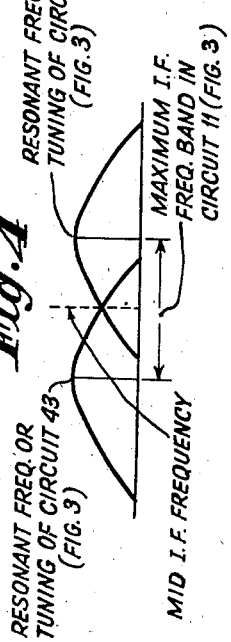
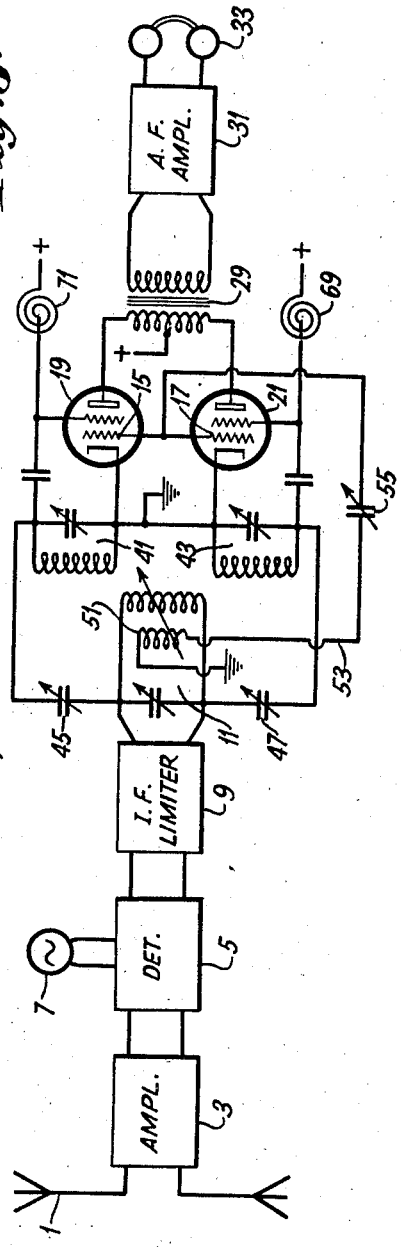
INVENTOR
*HARRY TUNICK*
BY
ATTORNEY

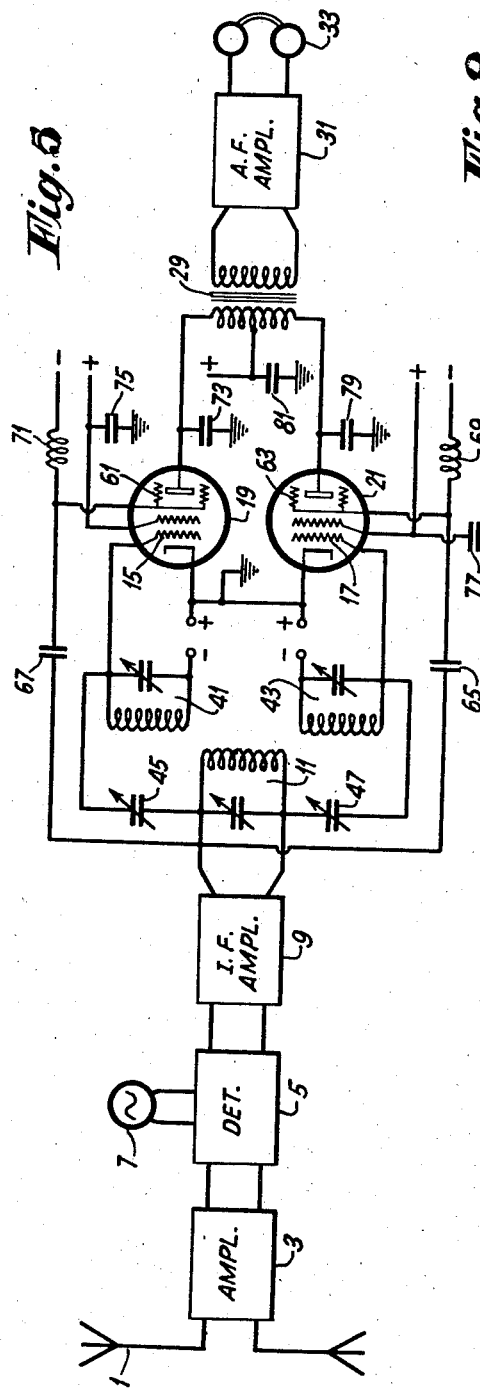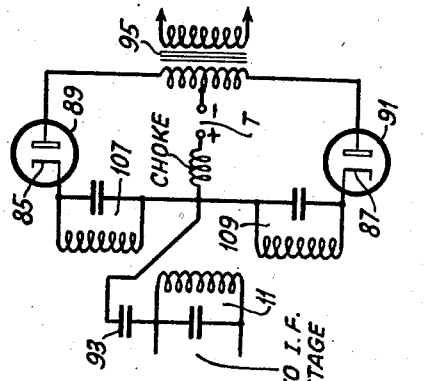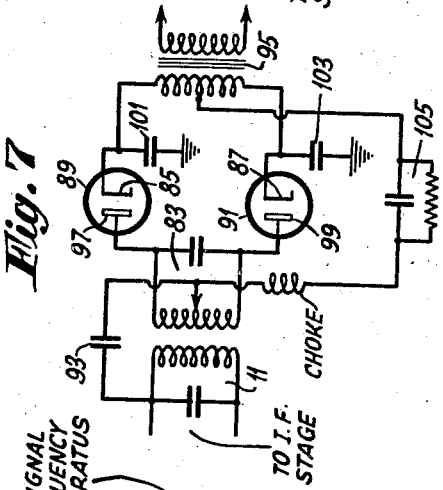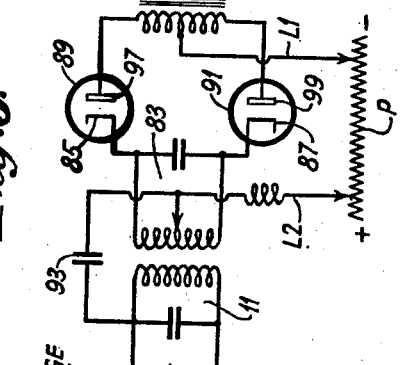

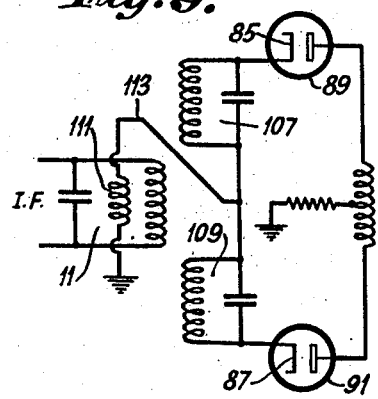
Fig. 9.
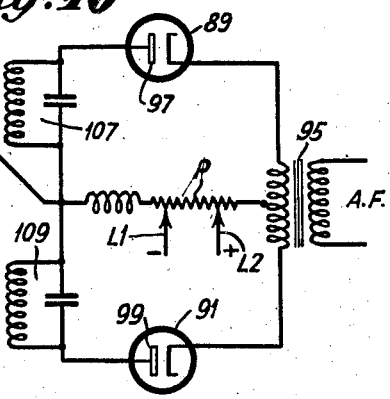
Fig. 10
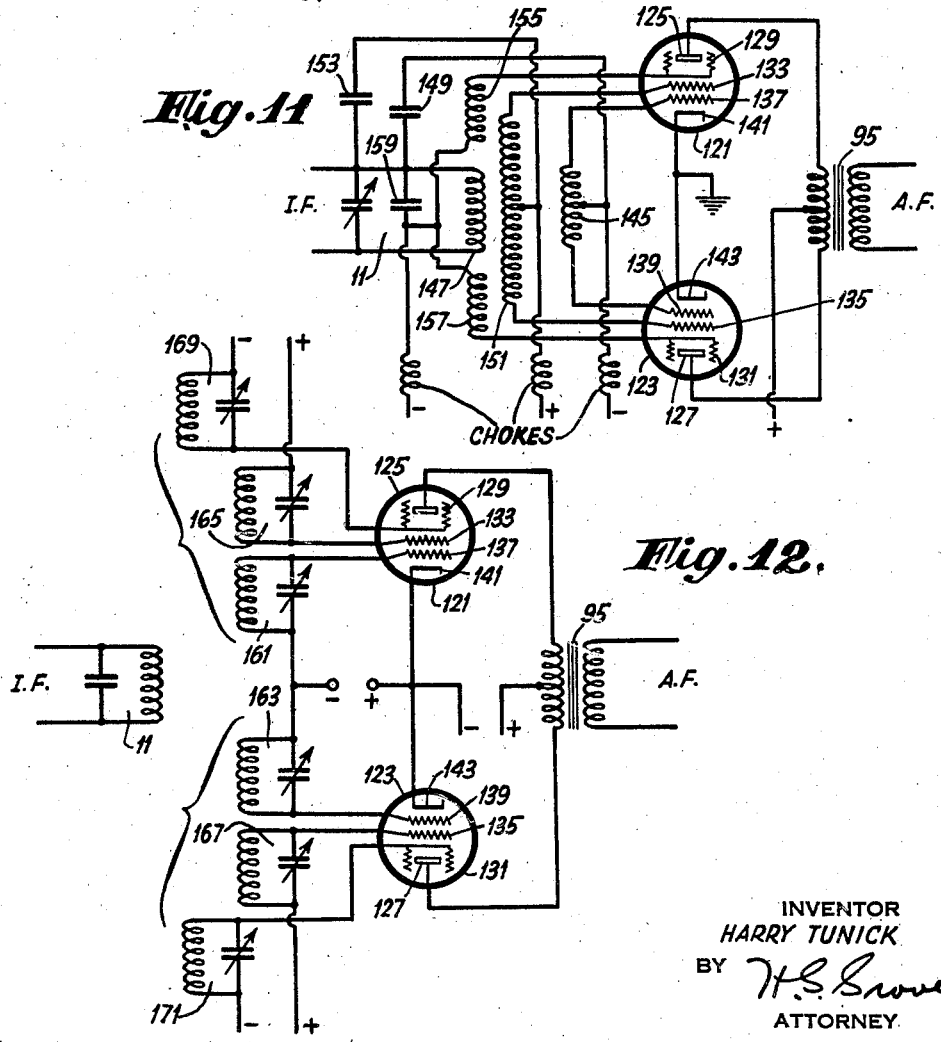
Fig. 11
Fig. 12.
INVENTOR
HARRY TUNICK
BY
ATTORNEY Patented May 5, 1942

2,282,101

UNITED STATES PATENT OFFICE 2,282,101

DETECTION OF FREQUENCY MODULATED WAVES

Harry Tunick, Rye, N. Y., assignor to Radio Corporation of America, a corporation of Delaware Original application December 22, 1939, Serial No. 310,495. Divided and this application October 16, 1940, Serial No. 361,413

8 Claims. (Cl. 250—27)

This is a division of my copending application Serial No. 310,495, filed December 22, 1939. Figures 1 to 12 inclusive herein correspond, respectively, to Figures 11, 12, 13, 13a, 14, 15, 16, 17, 18, 19, 20 and 21 of my parent application.

The main object of my present invention is to provide improved circuits for detecting frequency modulated waves. My present invention is particularly useful for securing reduction in background noise effects, as will be apparent as the more detailed description of my invention is given. Further other objects, as well as advantages, of my invention will be apparent as the more detailed description thereof proceeds. It is to be clearly understood that the apparatus described herein may be employed for the reception of phase modulated waves. In this event, however, the modulation amplifying circuits following the detector should have a characteristic such that amplification falls off with increase in modulation frequency.

In the accompanying drawings, Figure 1 illustrates schematically a frequency modulation receiver in which frequency modulated waves are fed cophasally to screen grids and antiphasally to control grids of a pair of push-pull connected detectors; Figure 2 is similar to Figure 1 with the exception that the screen grids are fed antiphasally with frequency modulated waves and the grids adjacent the cathodes are fed cophasally with frequency modulated waves; Figure 3 is a wiring diagram of a frequency modulation receiving system employing the cophasal excitation feature of Figure 2 and off-tuned circuits adjusted in accordance with Figure 4; Figure 4 is a graph or explanatory curve illustrating adjustments of circuits employed in Figure 3; Figure 5 is a wiring diagram of a frequency modulation receiver similar in some respects to that illustrated in Figure 3; Figures 6, 7, 8, 9 and 10 are detector circuits employing features of my invention and also diode detectors; and Figures 11 and 12 are wiring diagrams of alternative forms of balanced detector systems especially useful for the conversion of angular velocity waves to waves varying in amplitude and for rectifying such waves of variable amplitude.

In the frequency modulation receiver of Figure 1, frequency modulated waves picked up on antenna 1 are amplified by radio frequency amplifier 3 and combined in first detector 5 with waves from the local generator 7. The beat, or intermediate frequency energy resulting from this combination in first detector 5, is amplified in an intermediate frequency amplifier 9 and then fed through tuned circuits 11, 13 in push-pull to the grids 15, 17 of balanced detector tubes 19, 21. Another portion of the intermediate frequency wave energy is fed through condenser 23 in push-push to the screen grids 25, 27, which are connected in parallel, of detector tubes 19, 21. The resultant audio frequency or signal output is fed through transformer 29, signal or audio amplifier 31 and thence to earphones or loudspeaker 33.

In the frequency modulation radio receiver of Figure 2, intermediate frequency energy appearing in tuned circuit 11 is inductively fed into coil 35, thereby exciting the screen grids 37, 39 in phase opposition. The control grids 15, 17 are connected in parallel and are excited cophasally from tuned circuit 11 by connection thereto through condenser 23 which passes all of the frequencies of intermediate frequency energy, as does also the coupling between circuit 11 and coil 35. The audio frequency or signal output of tubes 19, 21 are combined in phase opposition in the primary of transformer 29 and then fed to amplifier 31 and in turn to translating device 33, here shown as earphones.

In the receiver of Figure 3, intermediate frequency energy from intermediate frequency circuit 11 is inductively injected into tuned circuits 41, 43. If desired, the coupling between the coil of circuit 11 and the coils of circuits 41 and 43 may be eliminated, in which case energy may be transferred from circuit 11 into circuits 41, 43 by condensers 45, 47. Or, if desired, circuit 11 may be both inductively and capacitively coupled to circuits 41 and 43.

Circuit 41 is tuned to one extreme of the intermediate frequency band of frequencies and circuit 43 is tuned to the opposite extreme frequency of the intermediate band of frequency modulated waves appearing in circuit 11. Detectors 19, 21 will produce in transformer 29 the original audio frequency waves or signaling waves transmitted which may be amplified as before in the signal or audio amplifier 31 and translated by device 33.

As an additional feature, part of the intermediate frequency wave energy from circuit 11 may be inductively fed through coil 51 and lead 53 in push-push to the parallelly connected grids 15, 17 of push-pull connected rectifier tubes 19, 21. Variable condenser 55 may be provided, as shown, for adjusting the phase of the energy fed in push-push to the grids 15, 17.

In the receiver of Figure 5, circuits 11, 41 and 43 are adjusted and coupled as described in connection with Figure 3. Also, if desired, the additional or alternative coupling through condensers 45 and 47 may be provided. It is to be noted, however, in Figure 5 that circuits 41 and 43 are connected to the control grids 15, 17 rather than to the screen grids of tubes 19, 21.

As so far described, the receiver of Figure 5 will operate to produce signals in the push-pull connected plate circuit of tubes 19 and 21 which may be fed through transformer 29 to amplifier 31 for translation in device 33. If desired, the suppressor grids 61, 63 may be connected in parallel to one side of circuit 11 as shown through large by-passing condensers 65, 67. In this way, the suppressor grids 61, 63 are excited cophasally with intermediate frequency energy from intermediate frequency amplifier 9. For obvious reasons, choke coils 69, 71 and by-passing condensers 73, 75, 77, 79 and 81 are provided.

All of the frequency modulation receivers described herein may be used to receive phase modulated waves, it being understood that, preferably, an additional correction circuit is added to the signal or audio frequency amplifier stages of the receiver. This additional correction should have a characteristic such that the amplifier output falls off with increase in frequency. The preferred correction circuit for the receivers described herein when used to receive phase modulated waves is described in Crosby Patent No. 2,060,611.

In the frequency modulation detector of Figure 6, circuit 11, in which intermediate frequency, frequency modulated energy appears, is coupled to tuned circuit 83 exciting the cathodes 85, 87 of diodes 89, 91 in phase opposition. Cophasal excitation also takes place through condenser 93. The de-modulated signal is taken from transformer 95 connected subtractively or in phase opposition between the anodes of diode detectors 89, 91. The receiver or detecting arrangement of Figure 7 is similar to that of Figure 6, it being noted that circuit 83 is connected between the anodes 97, 99 of the diode detectors 89, 91. Also, if desired, by-passing condensers 101, 103 connected to opposite sides of the primary of transformer 95 may be provided and the direct current circuit between anodes and cathodes may be completed by the condenser resistance circuit 105.

In the receiving arrangement of Figure 8, intermediate frequency circuit 11 is coupled to circuits 107, 109 tuned to opposite sides of the mean intermediate frequency, as described in connection with Figures 3 and 4. If desired, additional cophasal excitation of the cathodes 85, 87 may be provided by condenser connection 93, but this, it is to be understood, is not essential.

The receiver or detecting circuit of Figure 9 is essentially that of Figure 8, circuits 107, 109 being off-tuned as before. The cathodes 85, 87 are connected to ground through coil 111, which may be coupled to the coil of circuit 11 so as to additionally excite the cathodes 85, 87 in push-push relationship. Coil 111 is not essential, of course, and may be omitted entirely, in which case lead 113 may be connected directly to ground.

Figure 10 is a wiring diagram of a receiver similar to that of Figure 8, it being noted, however, that the off-tuned circuits 107, 109 are connected between the anodes 97, 99 of the diode detectors 89, 91. The additional coupling provided by condenser 93 may be provided if desired.

The receiver or detector circuit of Figure 11 is provided with an input circuit 11 described hereinbefore. The detector tubes 121, 123 are provided with anodes 125, 127, suppressor grids 129, 131, screen grids 133, 135, control grids 137, 139 and cathodes 141, 143. The control grids 137, 139 are connected in phase opposition by coil 145 coupled to coil 147 of circuit 11. Additional push-push excitation of control grids 137, 139 may be provided, if desired, by condenser 149.

Screen grids 133, 135 are connected in phase opposition by coil 151 coupled to coil 147. The screen grids may be additionally excited in push-push by condenser 153 if desired.

The suppressor grids 129, 131 are connected in phase opposition by coils 155, 157 also coupled to coil 147. Additional suppressor grid excitation in push-push may be provided by condenser 159 if desired. Grids 137, 133 and 129 are excited cophasally with successively higher voltages. They may, of course, be excited with the same voltage or with successively decreasing voltages or with any related voltages, depending upon the closeness of coupling of coils 145, 151 and 155 with coil 147. Grids 139, 135 and 131 of detector tube 123 are similarly excited, it being noted that the inductive coupling makes the group of grids of tube 123 excited respectively out of phase with the corresponding group of grids of tube 121. The resultant audio signal frequency energy, as before, is combined in transformer 95 and utilized as found desirable.

In the receiving or detecting system of Figure 12, the intermediate frequency circuit 11 is inductively coupled to pairs of off-tuned circuits 161, 163; 165, 167 and 169, 171. The off tuning of these circuits is as described in connection with Figures 3 and 4. The pair of circuits 161, 163 are connected to the grids 137, 139 of detector tubes 121, 123. The pair of off-tuned circuits 165, 167 are connected to the screen grids 133, 135 and the pair of off-tuned circuits 169, 171 are connected to the suppressor grids 129, 131 of detector tubes 121, 123 whose anodes 125, 127 are connected as shown to the primary of signal frequency output transformer 95.

By suitable adjustment of coupling between circuit 11 and circuits 161, 165 and 169, the grids 139, 133 and 129 of tube 121 are excited cophasally and may be excited in successively increasing amounts or the same amount or at different values in voltage. The grids of tube 123 are correspondingly excited. That is, the grids of tube 123 are similarly excited as to value and cophasally with respect to each other, but antiphasally or in phase opposition with respect to the grids of the other detector 121.

In connection with Figure 11, although not so illustrated, coil 145 is preferably tuned to the mean frequency by means of a condenser in shunt therewith and also preferably coil 151 should be so tuned and coils 155 and 157 taken together should be so tuned.

As indicated hereinabove, all of the detector systems may be employed for the reception of phase modulated waves. In this event, the audio modulating system should have a characteristic such that its output falls off with increasing modulation frequency. Preferably, this falling off should be such that the output of the audio amplifier varies inversely with the audio or modulation frequency. The detecting systems are not limited to the reception of voice frequency modulated waves, but may be employed for the reception of other types of signals, such as facsimile, television, code, etc., wherein the carrier wave has been modulated in frequency by the signal. Where the frequency modulation is large in extent, the various circuits may be broadened by the series or parallel insertion of resistors so that the detecting system accommodates the frequency swing of the received waves or the highest modulation frequency, whichever is greater.

In Figure 6 it is to be noted that a direct current voltage is impressed from potentiometer P through leads L₁ and L₂ across the plates and cathodes of the diode detectors. Similarly, through terminals T of Figure 8 such a voltage is impressed across the electrodes of the diode detectors 89, 91 and a similar voltage is impressed in the system shown in Figure 10 through potentiometer P and leads L₁ and L₂. This biasing potential so impressed serves the function of reducing noise since small variations impressed on the diodes cannot override the biasing potential. This is accomplished only by a substantial signal. In this way, background noise is further reduced.

Having thus described my invention, what I claim is:

1. In combination, a pair of electron discharge systems each having an input electrode and an output electrode, a pair of parallel tuned circuits connected to and between said input electrodes of said systems, said parallel tuned circuits being tuned to opposite sides of a mean operating frequency, a source of frequency modulated waves, means for feeding frequency modulated waves from said source to said parallel tuned circuits, said circuits serving to convert frequency modulation to amplitude modulation, a circuit connected to and between said output electrodes for taking modulation frequency energy from said output electrodes of said systems, and additional means for feeding frequency modulated waves from said source cophasally to like input electrodes of said systems.

2. In combination, a pair of diode rectifier systems each having an input electrode and an output electrode, a pair of parallel tuned circuits tuned to opposite sides of a mean operating frequency connected to like electrodes of said systems, means for inductively feeding frequency modulated waves to said parallel tuned circuits in such a way that circulating currents are set up in said parallel tuned circuits, and additional means other than said inductive feeding means for cophasally exciting with frequency modulated waves like electrodes of said diode systems.

3. In combination, a pair of diode rectifiers each having an anode and a cathode, a first parallel tuned circuit tuned to one side of a mean frequency connected between the anode and cathode of one rectifier, a second parallel tuned circuit tuned to a frequency on the opposite side of said mean frequency, said second tuned circuit being connected between the anode and cathode of the second rectifier, means inductively coupled to said parallel tuned circuits for feeding frequency modulated waves to said parallel tuned circuits, and additional means for cophasally exciting the cathodes of said rectifiers with frequency modulated waves, and means for deriving frequency modulated wave energy from said rectifier systems.

4. A detecting system for frequency or phase modulated waves comprising a pair of diode detectors, a discriminator circuit connected to like electrodes of said diode detectors, an output circuit connected to other like electrodes of said diode detectors, a direct current circuit connected in shunt to the electrodes of each diode detector, and means to impress a direct current potential upon said direct current circuit in such a direction as to oppose the voltage arising across said circuit because of rectified current action whereby noise due to small frequency or phase shifts is substantially reduced.

5. In combination, a pair of electron discharge systems each having an input electrode and an output electrode, a pair of parallel tuned circuits connected to and between said input electrodes of said systems, said parallel tuned circuits being tuned to opposite sides of a mean operating frequency, a third parallel tuned circuit, a source of angular velocity modulated waves, means for feeding waves from said source to said third tuned circuit, said third tuned circuit being inductively coupled to said pair of parallel tuned circuits thereby feedng angular velocity modulated waves to said pair of parallel tuned circuits, and a condenser connected to said pair of parallel tuned circuits and to said third tuned circuit for additionally feeding angular velocity modulated waves from said third circuit to said pair of parallel tuned circuits, said third tuned circuit being tuned to the mid-frequency of the angular velocity modulated waves.

6. In combination, a pair of diode rectifiers each having an anode and a cathode, a first parallel tuned circuit tuned to one side of a mean frequency connected between the anode and cathode of one rectifier, a second parallel tuned circuit tuned to a frequency on the opposite side of said mean frequency, said second tuned circuit being connected between the anode and cathode of the second rectifier, means inductively coupled to said parallel tuned circuits for feeding frequency modulated waves to said parallel tuned circuits, and additional means for cophasally exciting the anodes of said rectifiers with frequency modulated waves, and means for deriving frequency modulated wave energy from said rectifier systems.

7. A detecting system for angular velocity modulated waves comprising a pair of diode detectors, a pair of oppositely tuned circuits connected to like electrodes of said diode detectors, an output circuit connected to other like electrodes of said diode detectors, a direct current circuit connected in shunt to the electrodes of each diode detector, and means to impress a direct current potential upon said direct current circuit in such a direction and of suitable value as to oppose the voltage arising across said circuit because of rectified current action whereby noise due to small angular velocity shifts is substantially reduced.

8. A detecting system for angular velocity modulated waves comprising a pair of diode detectors, a discriminator circuit connected to like electrodes of said diode detectors, an output circuit connected to other like electrodes of said diode detectors, and a circuit connected in shunt to the electrodes of each diode detector, said shunt circuit operating to impress a uni-directional voltage of such value and in such direction across the electrodes of each detector as to oppose the voltage arising across said circuit because of rectified current action for small angular velocity shifts whereby noise due to such small angular velocity shifts is substantially reduced.

HARRY TUNICK.